United States Patent
Natarajan et al.

(10) Patent No.: US 10,244,051 B2
(45) Date of Patent: Mar. 26, 2019

(54) CLOUD METADATA DISCOVERY API

(71) Applicant: Microsoft Technology Licensing, LLC., Redmond, WA (US)

(72) Inventors: Shriram Natarajan, Redmond, WA (US); Vladimir Pogrebinsky, Redmond, WA (US); Ryan Jones, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 15/135,884

(22) Filed: Apr. 22, 2016

(65) Prior Publication Data

US 2017/0171300 A1  Jun. 15, 2017

Related U.S. Application Data

(60) Provisional application No. 62/266,669, filed on Dec. 13, 2015.

(51) Int. Cl.
  *H04L 29/08* (2006.01)
  *H04L 29/12* (2006.01)
  *G06F 11/07* (2006.01)

(52) U.S. Cl.
  CPC ...... *H04L 67/1097* (2013.01); *H04L 61/1582* (2013.01); *G06F 11/07* (2013.01); *H04L 61/1505* (2013.01); *H04L 61/1541* (2013.01)

(58) Field of Classification Search
CPC .. G06F 11/07; H04L 61/1505; H04L 61/1541; H04L 61/1582; H04L 67/1097
See application file for complete search history.

(56) References Cited

U.S. PATENT DOCUMENTS

| 8,543,471 B2 | 9/2013 | Salowey et al. |
| 2010/0318609 A1* | 12/2010 | Lahiri ............... G06F 9/455 709/205 |
| 2011/0277026 A1 | 11/2011 | Agarwal et al. |
| 2012/0198073 A1 | 8/2012 | Srikanth et al. |
| 2013/0254847 A1* | 9/2013 | Adams ............... G06F 21/6218 726/4 |
| 2016/0277497 A1* | 9/2016 | Bannister ............ H04L 67/1097 |

OTHER PUBLICATIONS

Smalser, Aaron, "What is application access and single sign-on with Azure Active Directory?", retrieved on: Mar. 8, 2016, available at: https://azure.microsoft.com/en-in/documentation/articles/active-directory-appssoaccess-whatis/ (12 pages).

Cogswell, Jeff, "Introduction to the OpenStack API", published on: Jan. 16, 2015 available at: https://www.linux.com/learn/tutorials/802976-introduction-to-the-openstack-api (4 pages).

(Continued)

*Primary Examiner* — Gil H. Lee
(74) *Attorney, Agent, or Firm* — Workman Nydegger

(57) ABSTRACT

Embodiments provide an API that provides metadata about a cloud service's endpoints in response to a single query. This allows a cloud service to advertise each of its endpoints through a common endpoint. The common endpoint may be present in each of a plurality of cloud services, thereby allowing each cloud service automatically discover metadata for other cloud services.

19 Claims, 4 Drawing Sheets

(56) References Cited

OTHER PUBLICATIONS

Centrify, "Blue Coat Technology Partner: Centrify", Solution Brief, retrieved on: Mar. 8, 2016 available at: https://www.bluecoat.com/documents/download/5574c696-8c29-4010-8791-df6c0ebc60f2/fe631e4c-4e87-430b-bbd8-dd1c5523e167 (2 pages).

Mortimore, et al., "Implementing Single Sign-On Across Multiple Organizations", published on: Aug. 17, 2014 available at: https://developer.salesforce.com/page/Implementing_Single_Sign-On_Across_Multiple_Organizations (12 pages).

Kotecha, et al., "Query Translation for Cloud Databases", in Proceedings of International Conference on Current Trends in Technology, Dec. 8, 2011, pp. 1-4.

"How to achieve single sign-on across multiple clouds", retrieved on: Mar. 8, 2016 available at: http://adf.ly/5703174/int/http:/www.forup.pl/video/Q2RJU1IBT1JwakE=/how_to_achieve_single_sign_on_across_multiple_cloudshttp:/adf.ly/5703174/int/http:/www.forup.pl/video/Q2RJU1IBT1JwakE=/how_to_achieve_single_sign_on_across_multiple_clouds (3 pages).

Bertocci, Vittorio, "The Common Endpoint: Walks like a Tenant, Talks Like a Tenant . . . But Is Not a Tenant", published on: Aug. 26, 2014 available at: http://www.cloudidentity.com/blog/2014/08/26/the-common-endpoint-walks-like-a-tenant-talks-like-a-tenant-but-is-not-a-tenant/ (5 pages).

Terkaly, Bruno, "Fundamentals of Active Directory—In the Cloud (Azure Active Directory) and On-Premises (Windows Server Active Directory) and Hybrid", published on: Jul. 17, 2014 available at: https://blogs.msdn.microsoft.com/brunoterkaly/2014/07/17/fundamentals-of-active-directory-in-the-cloud-azure-active-directory-and-on-premises-windows-server-active-directory-and-hybrid/ (9 pages).

Schranz, Thomas, "Easily Create API Backends", published on: Mar. 1, 2016 available at: https://cloud.google.com/endpoints/ (7 pages).

Hyperoffice, "Active Directory and the Cloud", HyperOffice Collaboration Made Simple White Paper, Sep. 9, 2011, (6 pages).

Google, "Storing and Retrieving Instance Metadata", retrieved on: Mar. 8, 2016 available at: https://cloud.google.com/compute/docs/metadata (16 pages).

Higa, Sidney, "Azure SQL Database elastic database query overview (preview)", retrieved on: Mar. 8, 2016 available at: https://azure.microsoft.com/en-us/documentation/articles/sql-database-elastic-query-overview/ (9 pages).

* cited by examiner

CLOUD METADATA DISCOVERY API

CROSS-REFERENCE TO RELATED APPLICATIONS

This application claims the benefit of the filing date of U.S. Provisional Patent Application No. 62/266,669, which is titled "Cloud Metadata Discovery API" and was filed Dec. 13, 2015, the disclosure of which is hereby incorporated by reference herein in its entirety.

BACKGROUND

Each cloud system comprises different sets endpoints that are used to deliver services to end users. Typically, these endpoints have been hard coded in tools or the end-user is expected to know about them before interacting with the clouds. Users have had the ability to add custom environments, but that requires the users to know about the cloud endpoints, and the onus is on the end-user to ensure accuracy. For example, Azure Cloud from Microsoft Corporation is hardcoded in these tools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When creating experiences that span multiple clouds, applications need to be configured with many details about those clouds. Typically this configuration is done manually which is subject to human error and is hard to change later, especially in a way that avoids downtime. This invention provides techniques for cataloging and exposing all the information necessary to build cloud experiences and also facilitate cloud reconfiguration without downtime of the application consuming the cloud by providing a discovery mechanism.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
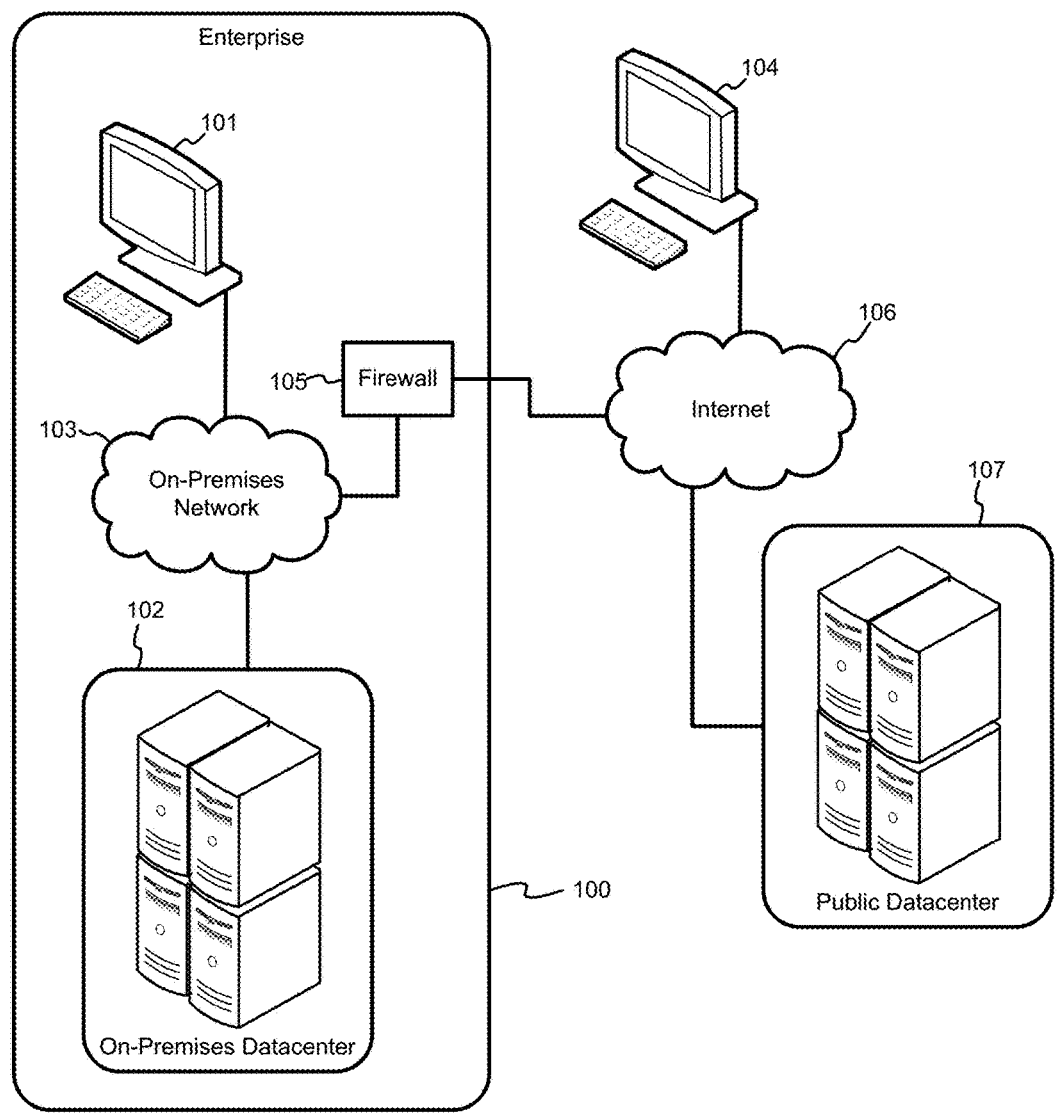
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter (private cloud) 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter (public cloud) 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
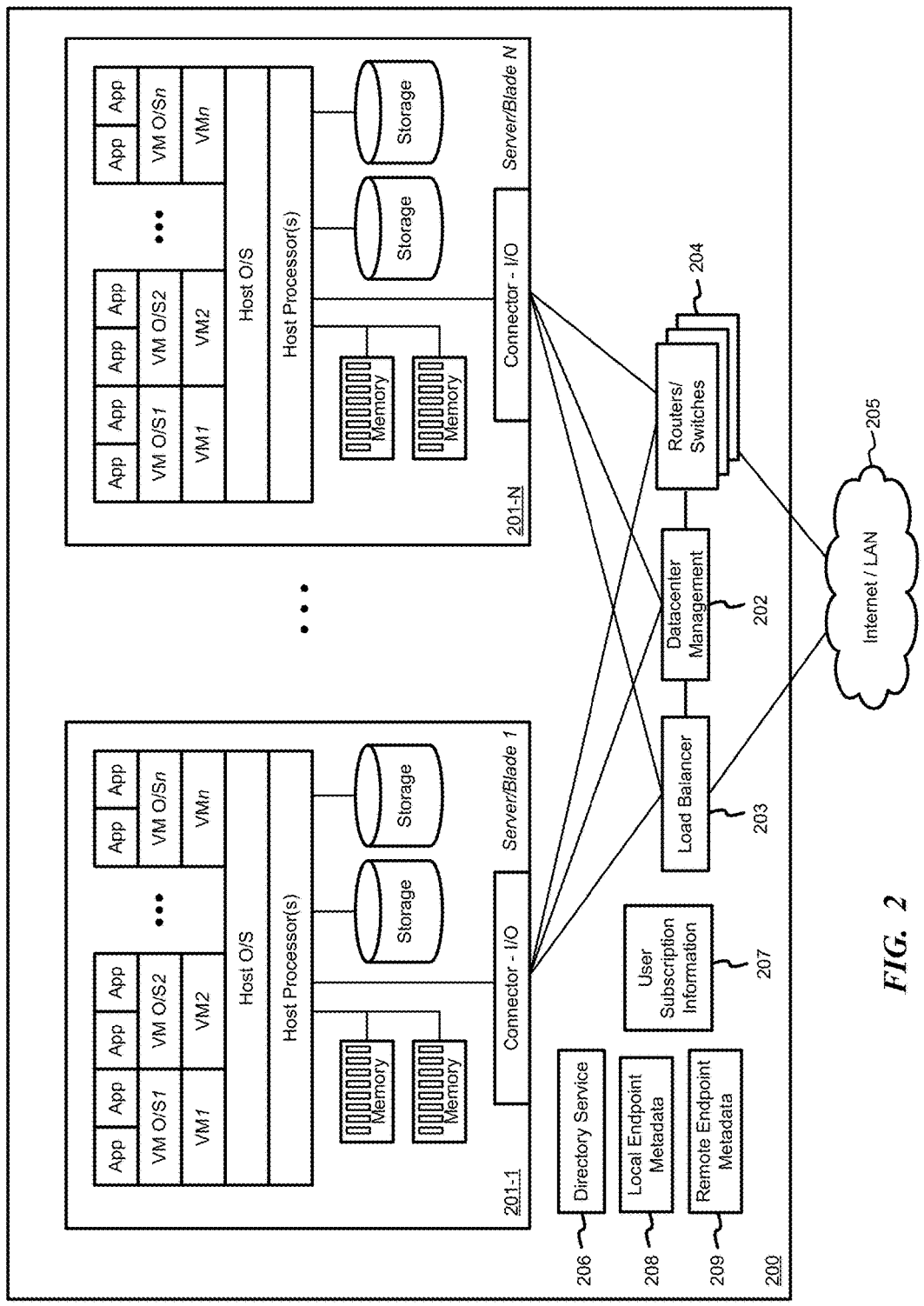
FIG. 2 is a block diagram of a datacenter that provides cloud computing services or distributed computing services according to one embodiment.

FIG. 2 is a block diagram of a distributed computing network or datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, users generally only pay for what they use with cloud computing. By tapping into cloud services, users can harness the power of massive data centers without having to build, manage or maintain costly, complex IT building blocks. With the cloud, much of the complexity of IT is abstracted away, letting users focus just on the infrastructure, data and application development that really matter to their business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

As cloud services are diversified, public cloud presences, such as through Azure Cloud services from Microsoft Corporation, and private cloud presence, such as through Azure Stack from Microsoft Corporation, are spreading across different countries. Embodiments allow these clouds to advertise each of their endpoints through a common endpoint that is present in each of the clouds. This makes the lives of customers easier and reduces errors due to human intervention.

Embodiments implement an API at the API layer, which is the central interface that controls access to the underlying services. A sample response from this endpoint looks like:

```
{
 "authentication": {
  "authenticationEndpoint": "https://login.windows.net/",
  "resourceManagerResourceId": "https://management.core.windows.net/"
 },
 "galleryEndpoint": "https://gallery.azure.com/",
 "graphEndpoint": "https://graph.windows.net/",
 "managementPortalEndpoint": "https://portal.azure.com/",
 "resourceManagerEndpoint": "https://management.azure.com/",
}
```

Using this information, developer tools or users can authenticate themselves against an identity system in the cloud using their credentials and the resource identifiers that are specified by authentication protocols and that are obtained through this cloud metadata discovery API. Once successfully authenticated, users will be able to perform operations against the API.

There is a secondary aspect to the Discovery mechanism. When two or more clouds use the same identity system, we can store tags to each of these cloud's registration within the identity system. By doing this, when a user signs into an identity system, through any tool, the tool can automatically get a list of clouds that are registered and is available to the user.

With this mechanism, the cloud system reduces the number of inputs required from a user to consume a cloud to a single input. This greatly simplifies the transition to using multiple clouds and provides the user with a seamless experience.

Users require a lot of information to consume cloud services, such as the list of service endpoints and addresses. Embodiments provide a central location for obtaining information about a particular cloud service. An API call by the user or a service will return a list of all available endpoints in the cloud. This also allows services running on different clouds to interact with each other.

In one embodiment, the API allows a user, service, or resource operating on a first cloud to query a second cloud for endpoint metadata. In response to the query, the second cloud provides a response, such as in a JSON (JavaScript Object Notation) format, that includes a list of endpoints and addresses that are required to interact with the second cloud. In this way, the user, service, or resource on the first cloud does not have to know all of the hardcoded information about the second cloud before interacting with the second cloud. This also allows for automatic or self-discovery of the cloud.

Additionally, in other embodiments, when a user signs in using a directory service, such as Microsoft Corporation's Active Directory, the first cloud service may automatically query all other clouds for which the user has access. In this way, the first cloud may automatically obtain tokens for those other clouds and can then automatically access those clouds.

Referring again to FIG. 2, a distributed computing system may comprise a directory service 206 that is configured to authenticate and authorize users on the distributed computing system 200. A user subscription storage 207 is used to store information that identifies which services are available to users locally on the distributed computing system. The subscription storage 207 may also store information that identifies which services are available to users on one or more remote distributed computing systems or remote cloud systems.

A local endpoint metadata storage 208 stores endpoint metadata information associated with services that are available on the distributed computing system 200. A remote endpoint metadata storage 209 stores endpoint metadata information associated with services on the one or more remote cloud systems. The endpoint metadata information may include, for example, addresses for endpoints required to access management, authentication, and resource services.

The directory service 206 may be configured to identify one or more remote cloud systems that are associated with the user and to send an endpoint query to the remote cloud systems. The directory service 206 may be further configured to receive responses from the one or more remote cloud systems, wherein the responses comprises endpoint metadata information associated with the remote cloud systems. The directory service 206 may save the endpoint metadata information from the remote cloud systems to the remote endpoint metadata storage 209.

The directory service 206 may be further configured to respond to requests for endpoint metadata information received from remote cloud systems. The response from the directory service 206 may include, for example, a list of all available endpoints on the distributed computing system that are stored in the local endpoint metadata storage 208.

User subscription information storage 207, local endpoint metadata storage 208, and remote endpoint metadata storage 209 may be the same or separate storage media, such as computer storage media that includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can accessed by the system 200 and directory service 206.

Figure 3:
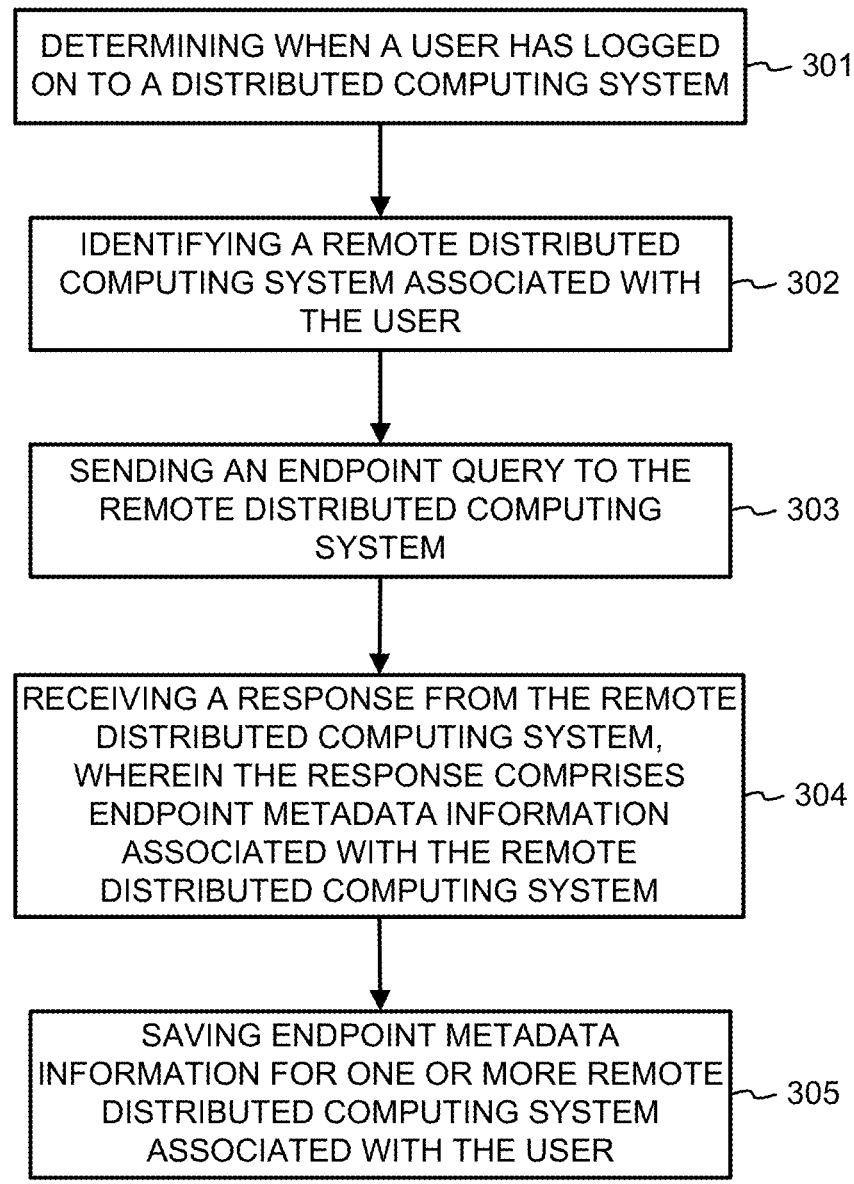
FIG. 3 is a flow chart illustrating an example method for obtaining metadata from a remote distributed computing system.

FIG. 3 is a flow chart illustrating an example method for obtaining metadata from a remote distributed computing system. In step 301, a local distributed computing system determines when a user has logged on. In one embodiment, a directory service on the local distributed computing system determines when a user has logged on. In step 302, a remote distributed computing system is identified as associated with the user. The local and remote distributed computing systems may provide, for example, separate cloud computing services, such as public and/or private cloud services.

In step 303, an endpoint query is sent to the remote distributed computing system. In one embodiment, the directory service may send the endpoint query to the remote distributed computing system. In step 304, a response is received from the remote distributed computing system. The response comprises endpoint metadata information associated with the remote distributed computing system. In step 305, the endpoint metadata information for one or more remote distributed computing system associated with the user is saved on the local distributed computing system.

The endpoint query may be a single request for all endpoint address information associated with the remote distributed computing system. The endpoint metadata information may include, for example, addresses for endpoints required to access management, authentication, and resource services on the remote distributed computing system. The endpoint metadata information may comprises a list of all available endpoints on the remote distributed computing system.

The response may comprise one or more of an authentication endpoint, a resource manager resource identifier, a gallery or marketplace endpoint, a graph or directory endpoint, a management portal endpoint, and a resource manager endpoint.

The directory service may use the endpoint metadata information for the remote distributed computing system to automatically obtain authentication tokens to allow the user to access that system.

Figure 4:
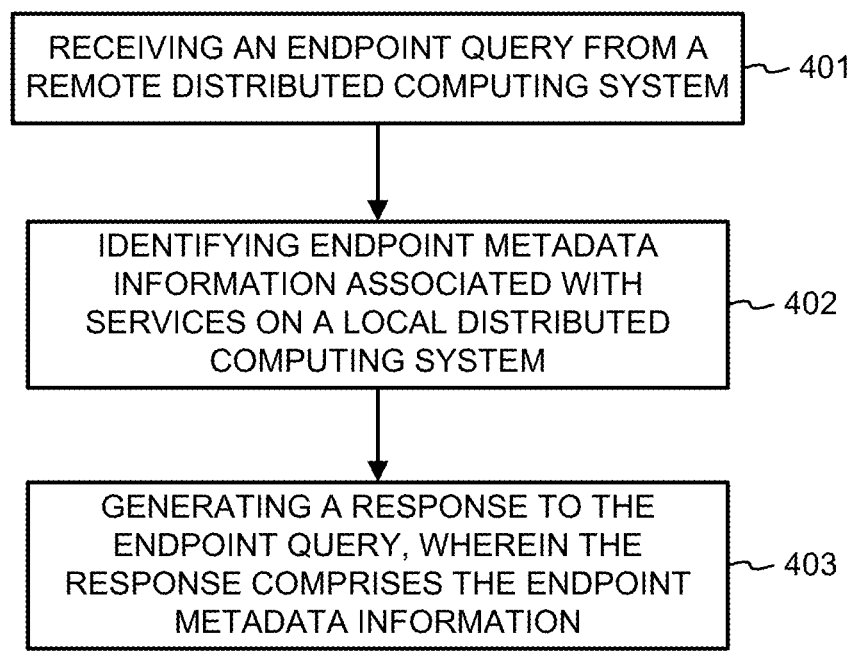
FIG. 4 is a flow chart illustrating an example method for providing metadata to a remote distributed computing system.

FIG. 4 is a flow chart illustrating an example method for providing metadata to a remote distributed computing system. In step 401, an endpoint query is received from a remote distributed computing system. In step 402, endpoint metadata information is identified as being associated with services on a local distributed computing system. In step 403, a response to the endpoint query is generated. The response comprises the endpoint metadata information for the local distributed computing system. The response is sent to the requesting remote distributed computing system, which allows the remote distributed computing system to access services on the local distributed computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at a local distributed computing system comprising one or more processors, for identifying endpoint metadata for a plurality of endpoints, the method comprising:

identifying a remote distributed computing system associated with the local distributed computing system;

automatically sending, from the local distributed computing system, an endpoint query to the remote distributed computing system according to an address preconfigured within the local distributed computing system, wherein the endpoint query is a single request for endpoint address metadata associated with the remote distributed computing system;

receiving, at the local distributed computing system, a response to the endpoint query from the remote distributed computing system, the response comprising endpoint metadata information for a plurality of endpoints associated with management or authentication services that are available on the remote distributed computing system, wherein the endpoint metadata information comprises at least an address for at least one endpoint that is usable by the local distributed computing system to access the at least one endpoint from the local distributed computing system; and automatically obtaining, based on the endpoint metadata information, at the local distributed computing system, authentication tokens for the remote distributed computing system to allow access to the plurality of endpoints on the remote distributed computing system.

2. The method of claim 1, wherein the endpoint metadata information further comprises addresses for endpoints required to access, resource services on the remote distributed computing system.

3. The method of claim 1, wherein the endpoint metadata information comprises a list of all available endpoints on the remote distributed computing system.

4. The method of claim 1, wherein the first distributed computing system and the remote distributed computing system provide separate cloud computing services.

5. The method of claim 1, wherein the response comprises one or more of an authentication endpoint, a resource manager resource identifier, a gallery or marketplace endpoint, a graph or directory endpoint, a management portal endpoint, and a resource manager endpoint.

6. The method of claim 1, further comprising:
saving endpoint metadata information for one or more remote distributed computing system associated with a user of the local distributed computing system.

7. The method of claim 1, wherein a directory service on the distributed computing system determines when a user has logged on to the local distributed computing system.

8. The method of claim 7, wherein the directory service sends the endpoint query to the remote distributed computing system.

9. The method of claim 7, wherein the response from the remote distributed computing system further comprises a list of endpoints and addresses that are required to interact with the second cloud.

10. A remote distributed computing system for providing authentication tokens to a local distributed computing system for accessing a plurality of remote endpoints associated with the local distributed computing system, the system comprising:
a directory service configured to authenticate and authorize local distributed computing systems at the remote distributed computing system;
a subscription storage comprising information identifying available services to the local distributed computing system, the available services comprising both local services available on the local distributed computing system and remote services available on one or more remote cloud systems;
a local endpoint metadata storage comprising endpoint metadata information associated with management or authentication services on the local distributed computing system; and
a remote endpoint metadata storage comprising endpoint metadata information associated with management or authentication services on the one or more remote cloud systems,
wherein, upon receiving a single endpoint query request automatically sent from the local distributed computing system, the directory service provides endpoint metadata information to the local distributed computing system, the endpoint metadata information including at least:
a plurality of remote endpoints that are identified, using the subscription storage, with management or authentication services available to the local distributed computing system; and
an address for accessing at least one remote endpoint of the plurality of remote endpoints that is available to the local distributed computing system;
wherein the directory service provides authentication tokens, automatically obtained based on the endpoint metadata information at the local distributed computing system, for the at least one remote endpoint that is available to the local distributed computing system to allow the local distributed computing system to access the at least one remote endpoint.

11. The system of claim 10, wherein the directory service is configured to identify a remote cloud system associated with a user of the local distributed computing system and to send an endpoint query to the remote cloud system.

12. The system of claim 10, wherein the directory service is configured to receive a response from a remote cloud system associated with a user of the local distributed computing system, wherein the response comprises endpoint metadata information associated with the remote cloud system.

13. The system of claim 12, wherein the directory service is further configured to save the endpoint metadata information to the remote endpoint metadata storage.

14. The system of claim 10, wherein the endpoint metadata information associated with services on the one or more remote cloud systems further comprises addresses for resource services on the remote cloud system.

15. The system of claim 12, wherein the directory service is further configured to respond to requests for endpoint metadata information received at the distributed computing system.

16. The system of claim 15, wherein the response comprises a list of all available endpoints on the distributed computing system that are stored in the local endpoint metadata storage.

17. A method, implemented at a remote distributed computing system, for providing authentication tokens for accessing a plurality of remote endpoints, the method comprising:
receiving, automatically sent from a local distributed computing system, a single endpoint query request comprising a request for endpoint address metadata associated with remote endpoints accessible through the remote distributed computing system;
based on an identity associated with the local distributed computing system, identifying a plurality of remote endpoints available to the local distributed computing system; and
transmitting to the local distributed computing system a response to the single endpoint query request, the response comprising at least:
endpoint metadata information for a plurality of remote endpoints available on the remote distributed computing system that are associated with management or authentication services that are available to the local distributed computing system; and
at least one address for accessing at least one remote endpoint of the plurality of remote endpoints that are available to the local distributed computing system;
providing one or more authentication tokens, automatically obtained based on the endpoint metadata information at the local distributed computing system, that allow the local distributed computing system to access the at least one remote endpoint.

18. The method of claim 17, wherein the endpoint metadata information
comprises addresses for endpoints required to access management, authentication, and resource services on the remote distributed computing system.

19. The method of claim 17, wherein the identity associated with the local distributed computing system is determined based on an identity of a user that is authenticated at the local distributed computing system.

* * * * *